(12) United States Patent
Gruddanti et al.

(10) Patent No.: US 12,321,294 B1
(45) Date of Patent: Jun. 3, 2025

(54) DATA LANE VARIATION COMPENSATION FOR DATA RATE ENHANCEMENT

(71) Applicant: Advanced Micro Devices, Inc., Santa Clara, CA (US)

(72) Inventors: Srikanth Reddy Gruddanti, Bangalore (IN); David Hugh McIntyre, Santa Clara, CA (US); Ramon Apostol Mangaser, Boxborogh, MA (US); Prasant Kumar Vallur, Bangalore (IN); Manoj N. Kulkarni, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 159 days.

(21) Appl. No.: 18/193,341

(22) Filed: Mar. 30, 2023

(51) Int. Cl.
*G06F 13/362* (2006.01)
*G06F 13/40* (2006.01)

(52) U.S. Cl.
CPC ...... *G06F 13/3625* (2013.01); *G06F 13/4059* (2013.01)

(58) Field of Classification Search
CPC .................................................. G06F 13/3625
See application file for complete search history.

(56) References Cited

U.S. PATENT DOCUMENTS

| | | | |
|---|---|---|---|
| 2007/0069784 A1* | 3/2007 | Shin ................. | H03K 19/00384 327/170 |
| 2007/0103338 A1* | 5/2007 | Teo ..................... | G06F 13/4018 340/933 |
| 2008/0054935 A1* | 3/2008 | Pan ...................... | G11C 29/028 326/30 |
| 2017/0373944 A1* | 12/2017 | Lackey, Jr. ........... | H04L 41/147 |
| 2019/0198067 A1* | 6/2019 | Lee ....................... | G11C 7/1066 |
| 2019/0280679 A1* | 9/2019 | Lyer ..................... | H01R 13/665 |
| 2020/0118518 A1* | 4/2020 | Chu ..................... | G09G 3/2096 |

* cited by examiner

*Primary Examiner* — Phong H Dang
(74) *Attorney, Agent, or Firm* — Greenberg Traurig, LLP

(57) ABSTRACT

The disclosed device includes a data path having multiple transmission drivers. The device also includes a controller that is configured to tune each of the transmission drivers to a signal speed of a reference transmission driver. Various other methods, systems, and computer-readable media are also disclosed.

20 Claims, 4 Drawing Sheets

DATA LANE VARIATION COMPENSATION FOR DATA RATE ENHANCEMENT

BACKGROUND

A die-to-die interface allows sending data between dies (e.g., chiplets, memory devices, etc.). To improve reliability of sending data, a die-to-die interface often pairs a data path with a clock path having a reference clock. The data can be read based off of a clock signal (e.g., a rising or falling edge of a strobe signal) provided by the reference clock to improve reliability of reading a data signal. In addition, to improve bandwidth, the data path can include multiple data lanes. With increased demand in high-performance computing, advancements in process technology have allowed scaling up of compute performance. However, data rate scaling has not achieved a similar scaling up.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
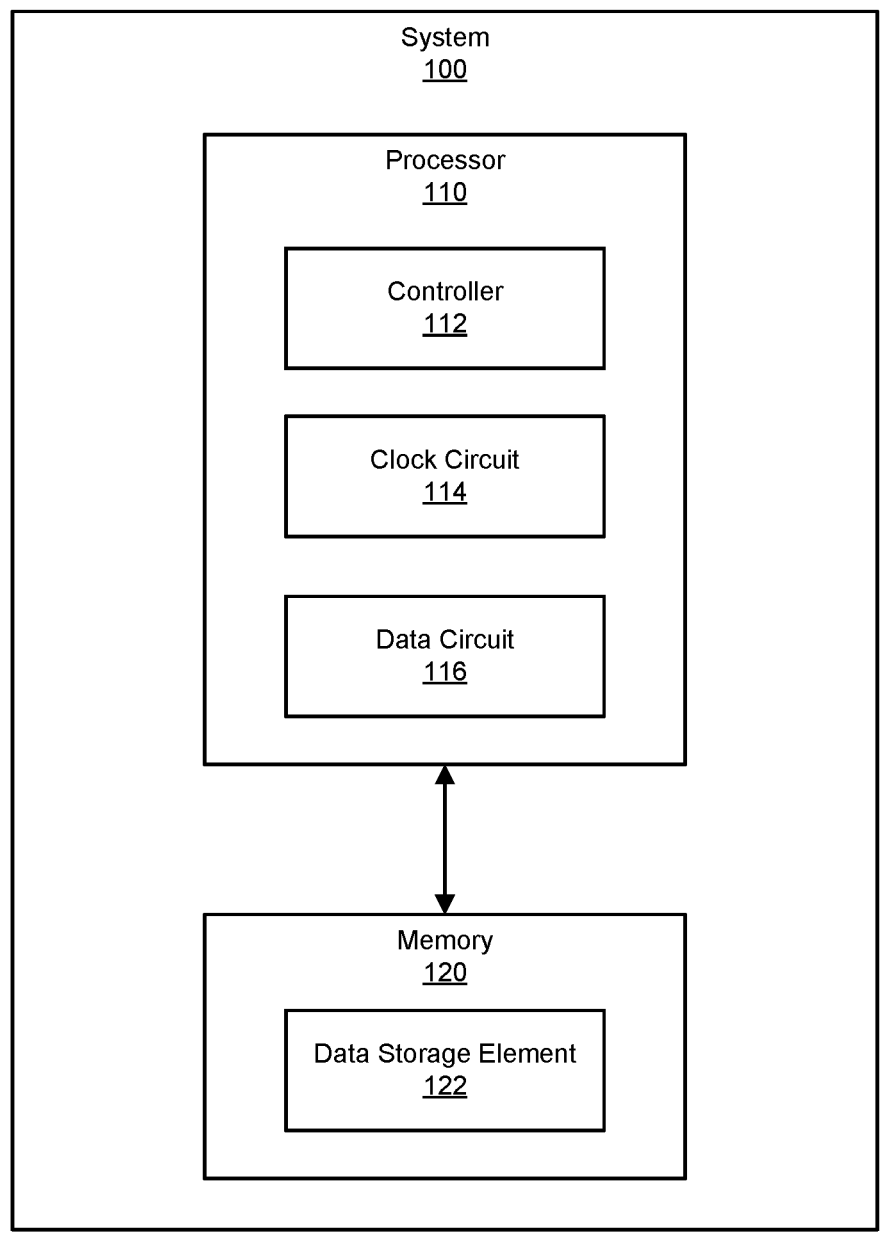
FIG. 1 is a block diagram of an exemplary system for data lane variation compensation.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to compensating for data lane variation in a die-to-die interface. Random and/or system variations can occur in signal transmission rates/frequencies across parallel data lanes, causing loss of data and in some examples requiring increasing link power to overcome the data loss. As will be explained in greater detail below, implementations of the present disclosure tune data lanes to a speed of a reference data lane, for example by tuning the transmission drivers for each lane. By tuning the transmission drivers, the data lane variation can be reduced, which can advantageously reduce a rate of data loss without significantly increasing link power (and in some cases reducing link power).

As will be described in greater detail below, the instant disclosure describes various systems and methods for data lane variation compensation in a die-to-die interface. A data path of the die-to-die interface can include multiple transmission drivers. A controller can tune the transmission drivers to a speed of a reference transmission driver (e.g., a fastest transmission driver) to compensate for data lane variations in signal transmission speeds.

In one implementation, a device for data lane variation compensation includes a data path including a plurality of transmission drivers, and a controller configured to tune each of the plurality of transmission drivers to a signal speed of a reference transmission driver of the plurality of transmission drivers.

In some examples, the controller is configured to find the reference transmission driver based on a finding a fast transmission driver of the plurality of transmission drivers. In some examples, the controller is configured to find the fast transmission driver by measuring a signal delay of at least one of the plurality of transmission drivers and selecting a transmission driver corresponding to a below average signal delay for the plurality of transmission drivers.

In some examples, the controller is configured to tune a transmission driver by changing a drive strength of the transmission driver to approximate the signal speed of the reference transmission driver. In some examples, the controller is configured to tune a transmission driver by changing an impedance of the transmission driver to approximate the signal speed of the reference transmission driver.

In some examples, the device includes a clock path having a reference clock circuit. In some examples, the controller is configured to set a clock delay for the reference clock circuit to align with the signal speed of the reference transmission driver. In some examples, the controller is configured to set the clock delay based on a midpoint of a phase of the reference transmission driver.

In some examples, the plurality of transmission drivers corresponds to a plurality of lanes for the data path. In some examples, the data path corresponds to a die-to-die interface. In some examples, the controller is configured to tune the plurality of transmission drivers at a link high-speed startup sequence.

In one implementation, a system for data lane variation compensation includes a clock path including a reference clock circuit, a data path including a plurality of lanes and a plurality of transmission drivers corresponding to the plurality of lanes, and a controller. The controller is configured to: (i) find a reference transmission driver of the plurality of transmission drivers based on signal speed, (ii) set a clock delay for the reference clock circuit to align with a signal speed of the reference transmission driver, and (iii) tune each of the plurality of transmission drivers to the signal speed of the reference transmission driver.

In some examples, the controller is configured to find a fastest transmission driver as the reference transmission driver by measuring a signal delay of each of the plurality of transmission drivers and selecting a transmission driver corresponding to a minimum of the signal delays. In some examples, the controller is configured to tune a transmission driver by changing a drive strength or an impedance of the transmission driver to approximate the signal speed of the reference transmission driver. In some examples, the controller is configured to set the clock delay based on a midpoint of a phase of the reference transmission driver.

In some examples, the data path corresponds to a die-to-die interface. In some examples, the controller is configured to tune the plurality of transmission drivers at a link high-speed startup sequence.

In one implementation, a method for compensating for data lane variation includes (i) measuring a signal delay from a plurality of data lanes for a die-to-die interface to find a fast data lane with respect to signal speed, (ii) setting a clock delay for a reference clock to align with the fastest data lane, and (iii) tuning each of the plurality of data lanes by tuning a transmission driver of each data lane to a signal speed of fastest data lane.

In some examples, tuning the transmission driver of each data lane includes increasing a drive strength of the transmission driver based on a signal delay difference from a reference transmission driver corresponding to the fast data lane. In some examples, tuning the transmission driver of each data lane includes iteratively tuning the transmission driver to match a signal speed of a reference transmission driver corresponding to the fast data lane.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of compensating for data lane variations in die-to-die interfaces. Detailed descriptions of example systems will be provided in connection with FIGS. 1 and 2. Detailed descriptions of data lane variation will be provided in connection with FIG. 3. Detailed descriptions of corresponding computer-implemented methods will also be provided in connection with FIG. 4.

FIG. 1 is a block diagram of an example system 100 for data lane variation compensation for die-to-die interfaces. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory. As further illustrated in FIG. 1, memory 120 includes a data storage element 122, which can correspond to a latch circuit, flip-flop, or other circuit for storing data. Data storage element 122 can be a clock-triggered element triggered by a clock signal.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a controller 112, a clock circuit 114, and a data circuit 116. Controller 112 can correspond to a circuit for controlling data circuit 116 and/or clock circuit 114. Clock circuit 114 can correspond to a reference clock (e.g., an oscillator or other clock) for sending clock signals that can trigger clock-triggered elements such as data storage element 122. The clock signals can oscillate between high and low values at particular frequencies to activate clock-triggered elements based on rising and/or falling edges of the oscillating clock signal. In some examples, clock circuit 114 can include a distribution tree or circuits for propagating the clock signal. Data circuit 116 corresponds to a circuit for sending a data signal in accordance with the clock signal of clock circuit 114. In some examples, data circuit 116 corresponds to a die-to-die interface for sending data between dies (e.g., processor 110 and memory 120 implemented as separate dies). As will be described further below, in some examples, data circuit 116 can include multiple parallel data lanes, each data lane having circuitry (e.g., a transmission driver) for sending a data signal.

Figure 2:
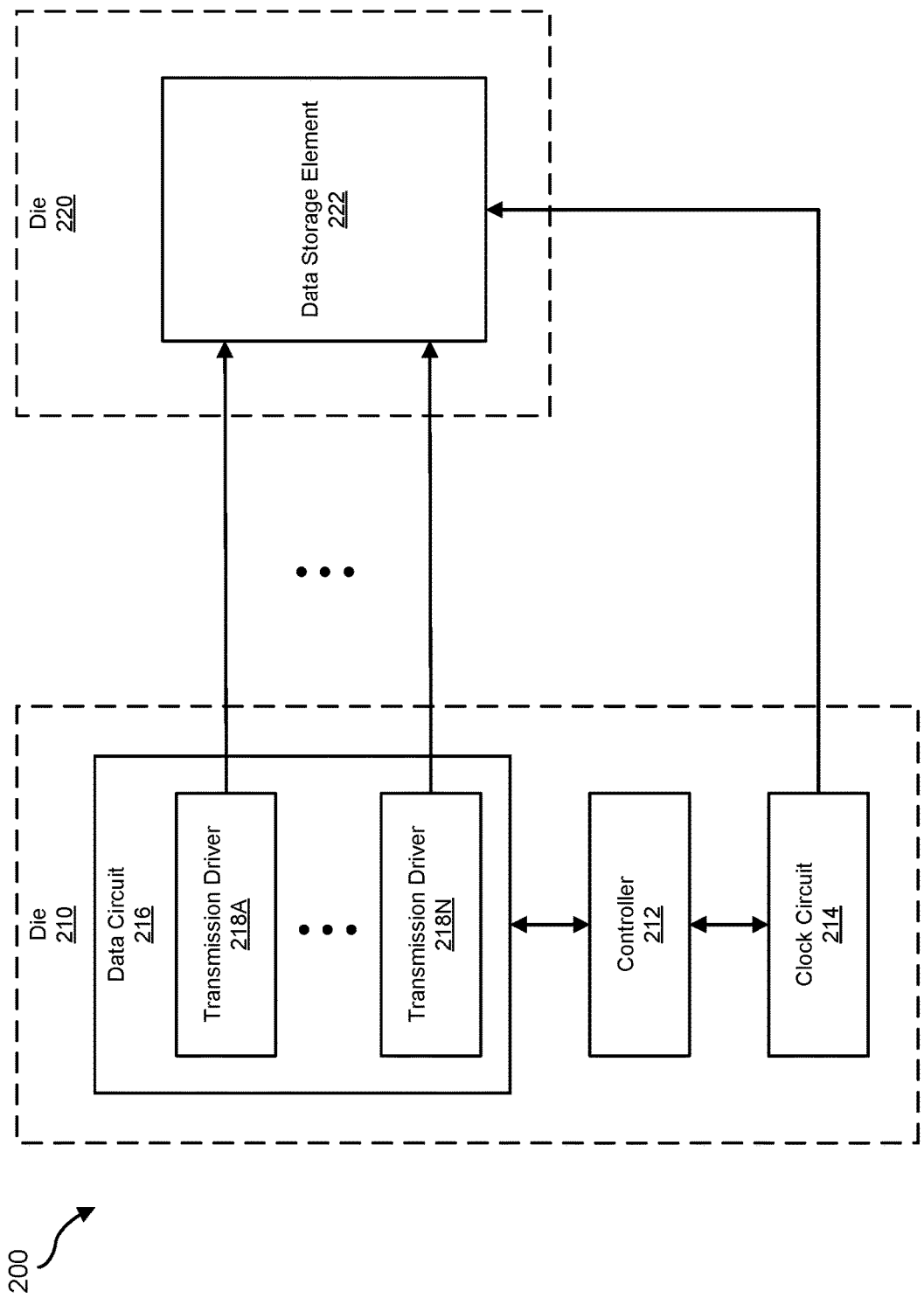
FIG. 2 is a simplified circuit diagram of an exemplary die-to-die interface for data lane variation compensation.

FIG. 2 illustrates an example system 200, which can correspond to system 100, for compensating for data lane variation in a die-to-die interface. As illustrated in FIG. 2, system 200 includes a die 210, which can correspond to processor 110 or any other device, and a die 220, which can correspond to memory 120 or any other device. Die 210 includes a data circuit 216, which can correspond to data circuit 116, a controller 212, which can correspond to controller 112, and a clock circuit 214, which can correspond to clock circuit 114. Controller 212 can configure clock circuit 214 and/or data circuit 216, as described herein. Die 220 includes a data storage element 222, which can correspond to data storage element 122.

As further illustrated in FIG. 2, data circuit 216 is coupled to data storage element 222 for sending data signals in connection with a clock signal from clock circuit 214. Data circuit 216 includes multiple parallel data lanes for sending data signals, each data lane having a transmission driver (e.g., transmission drivers 218A-218N) for sending data signals. Although not illustrated in FIG. 2, in some examples data storage element 222 can include individual receiving components for each data lane (e.g., a respective data storage element for each of transmission drivers 218A-218N). The data signals are designed to be sent in alignment based on the clock signal, such that data storage element 222 can read, as the data, the signal on each data lane during the corresponding clock edge. However, as described herein, system (e.g., design layout and distance between components) and/or other random variations (e.g., noise, temperature, etc.) can cause lane-to-lane variation between the data lanes, as will be described further with respect to FIG. 3.

Figure 3:
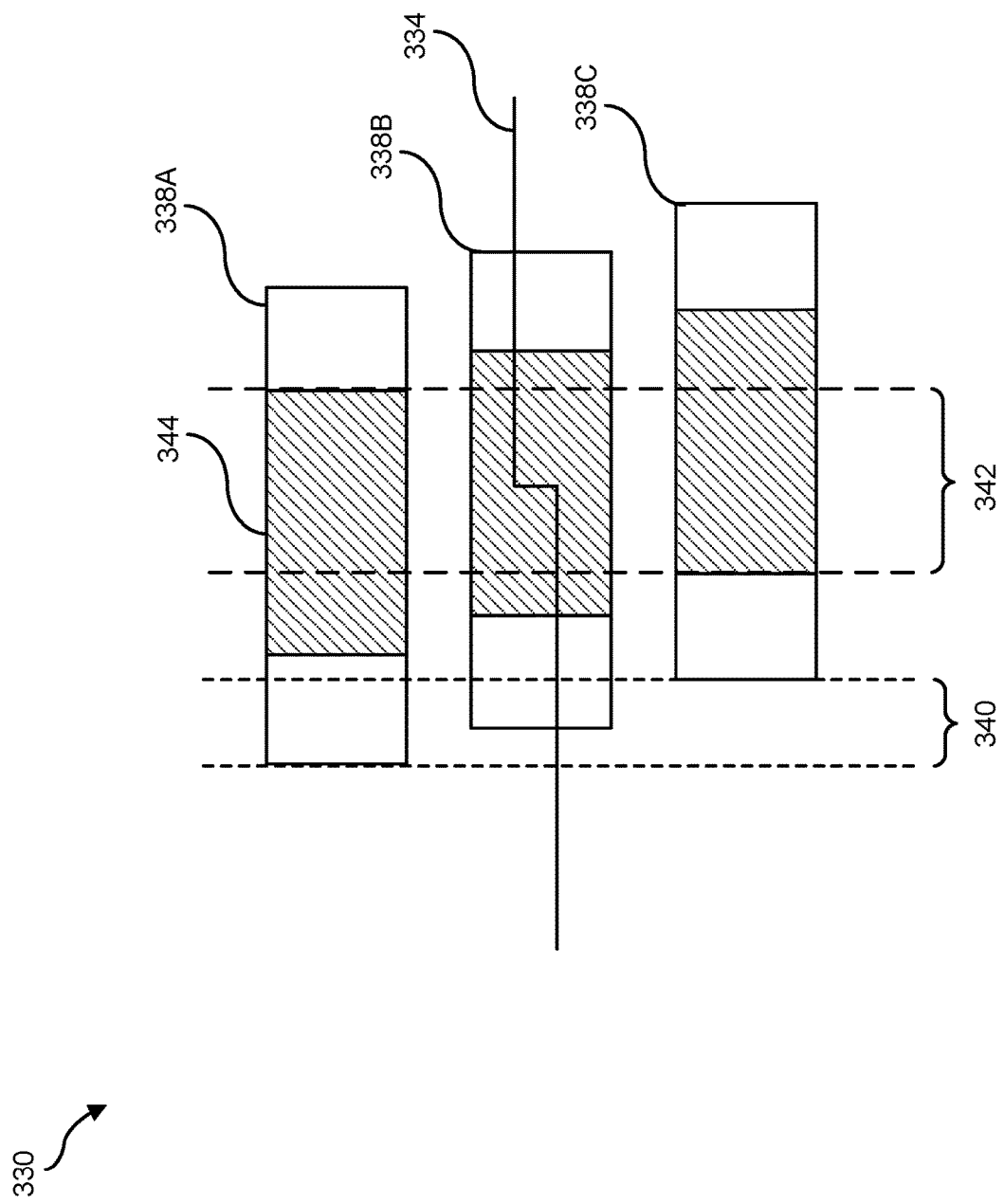
FIG. 3 is a diagram illustrate data lane variation.

FIG. 3 illustrates a diagram 330 showing a timing between data lanes. FIG. 3 illustrates a data lane window 338A that corresponds to an earliest data lane, a data lane window 338B that corresponds to an average data lane, and a data lane window 338C that corresponds to a late data lane. The widths of the data lane windows correspond to one cycle (e.g., a phase) for sending a data signal (e.g., a bit of data). Each data lane window illustrates, with a shaded portion, a signal 344 corresponding to when a data signal is readable during the respective data lane window. A clock signal 334 corresponds to when a data signal is read (e.g., at a rising edge as illustrated in FIG. 3).

As illustrated in FIG. 3, an eye-width 342 corresponds to a window from a signal start of the latest data lane (e.g., data lane window 338C) and a signal end of the earliest data lane (e.g., data lane window 338A). Aligning clock signal 334 to a midpoint of the phase of the average data lane window (e.g., data lane window 338B) can align clock signal 334 to eye-width 342. More specifically, aligning the clock edge of clock signal 334 to a midpoint of eye-width 342 can improve reliability in reading data signals, as the data signals from each data lane is more likely to be correctly read, as illustrated in FIG. 3, notwithstanding random deviations. However, consistently and/or reliably determining the average data lane window can be difficult and/or not feasible (e.g., incurring penalties such as additional overhead, components, etc.)

In addition, a lane-to-lane variation 340 corresponds to a difference between the start of the earliest data lane window (e.g., data lane window 338A) and the latest data lane window (e.g., data lane window 338C). As lane-to-lane variation 340 increases, eye-width 342 can accordingly decrease. A decreasing eye-width 342 can be more difficult for aligning clock signal 334, and further provides a smaller margin of error for data lane windows to remain within eye-width 342. Thus, decreasing lane-to-lane variation 340 to increase eye-width 342 can improve reliability and performance.

Figure 4:
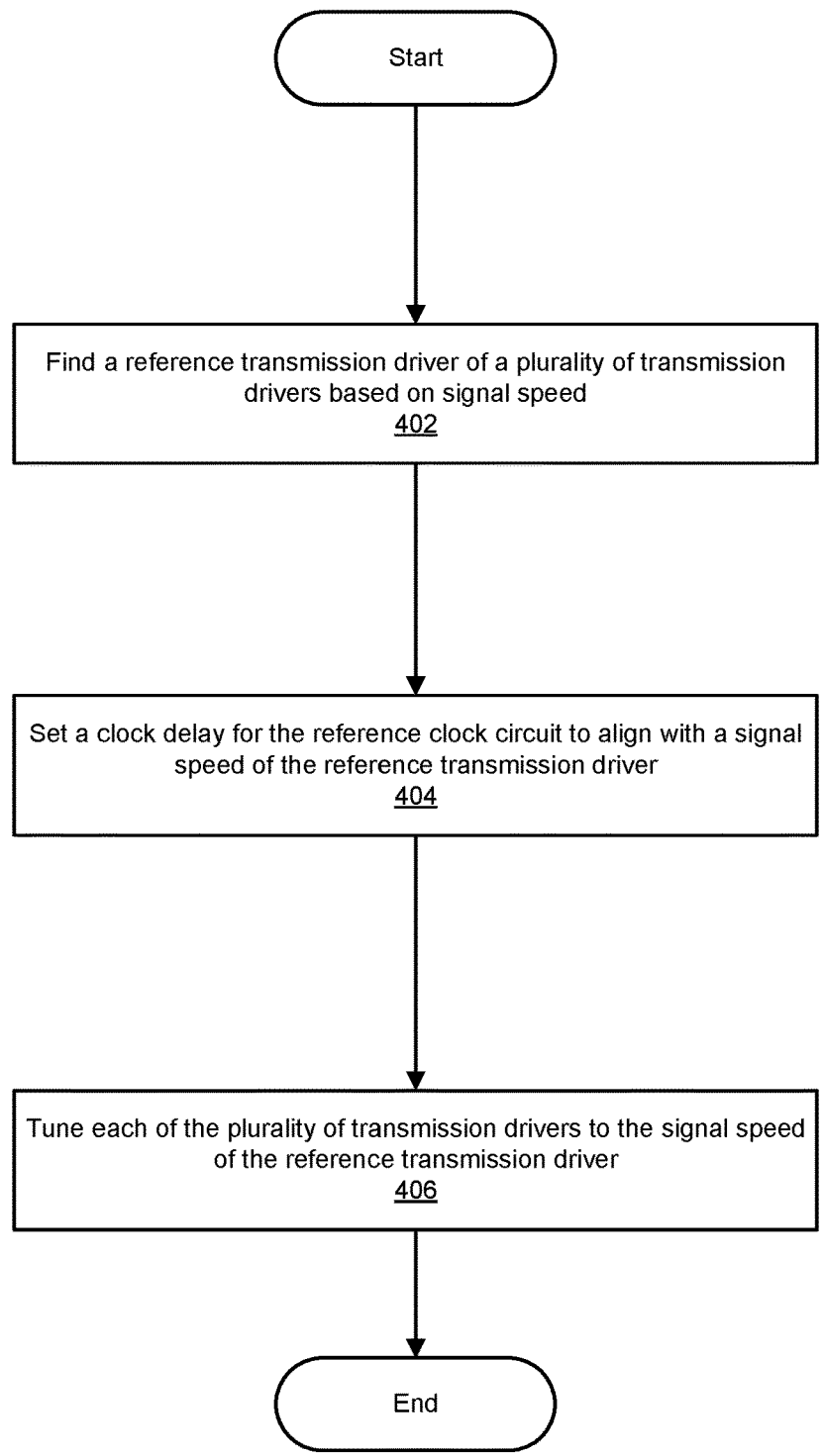
FIG. 4 is a flow diagram of an exemplary method for data lane variation compensation.

FIG. 4 is a flow diagram of an exemplary computer-implemented method 400 for compensating for data lane variation in die-to-die interfaces. The steps shown in FIG. 4 can be performed by any suitable computer-executable code and/or computing system, including the system(s) illustrated in FIGS. 1 and/or 2. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein finds a reference transmission driver of a plurality of transmission drivers based on signal speed. For example, controller 212 finds a reference transmission driver from transmission drivers 218A-218N. Although the reference transmission driver can be the fastest transmission driver, in other implementations, the reference transmission driver can be based on other criteria, such as the slowest transmission driver, median transmission driver, characteristics such as location, identifier, etc. In addition, the reference transmission driver can be selected based on a favorable characteristic, such as being faster than average and/or median, slower than average and/or median, etc. based on a use case.

The systems described herein can perform step 402 in a variety of ways. In one example, controller 212 measures a signal delay from a plurality of data lanes for a die-to-die interface to find a fast data lane with respect to signal speed. For example, the plurality of transmission drivers can correspond to the plurality of lanes for the data path such that controller 212 is configured to find the fast data lane (e.g., a fast transmission driver) by measuring a signal delay of at least one of the plurality of transmission drivers and selecting a transmission driver corresponding to a below average signal and/or minimum delay of the plurality of transmission drivers.

In other examples, controller 212 can find the reference transmission driver according to the relevant criteria. For example, controller 212 can measure the signal delays for finding the slowest data lane. In other examples, controller 212 can measure or otherwise identify the characteristics for evaluating the relevant criteria and accordingly selecting the reference transmission driver.

In yet other examples, controller 212 can measure a signal delay (and/or other characteristics) of one or more of transmission drivers 218A-218N and select the reference transmission driver (e.g., reference data lane) based on criteria for a given use case. For instance, controller 212 can select the reference transmission driver based on having a below average and/or median signal delay, an above average and/or median signal delay, etc. In some examples, controller 212 can select the reference transmission driver based on a tunability of the other transmission drivers, such that the reference transmission driver can be selected based on a greatest number of transmission drivers being tunable to approximate and/or match the reference transmission driver.

At step 404 one or more of the systems described herein sets a clock delay for the reference clock circuit to align with a signal speed of the reference transmission driver. For example, controller 212 sets a clock delay for clock circuit 214 to align with the signal speed of the reference transmission driver.

The systems described herein can perform step 404 in a variety of ways. In one example, controller 212 sets a clock delay for a reference clock to align with the fastest data lane. More specifically controller 212 is configured to set the clock delay for clock circuit 214 based on a midpoint of a phase of the reference transmission driver. As described above, setting clock circuit 214 to the average data lane can improve reliability and performance. The reference transmission driver (e.g., reference data lane) can approximate the average data lane by tuning all other data lanes to the reference data lane, as described herein.

At step 406 one or more of the systems described herein tunes each of the plurality of transmission drivers to the signal speed of the reference transmission driver. For example, controller 212 tunes each of transmission drivers 218A-218N to the reference transmission driver, although in some implementations controller 212 can skip the reference transmission driver itself.

The systems described herein can perform step 406 in a variety of ways. In one example, controller 212 is configured to tune a transmission driver by changing a drive strength and/or an impedance of the transmission driver to approximate the signal speed of the reference transmission driver. In some implementations, tuning the transmission driver of each data lane can include increasing a drive strength of the transmission driver based on a signal delay difference from a reference transmission driver corresponding to the fastest data lane. In other implementations, tuning the transmission driver of each data lane can include decreasing a drive strength of the transmission driver based on the signal delay difference from the reference transmission driver.

In some implementations, tuning the transmission driver of each data lane can include iteratively tuning the transmission driver to match a signal speed of a reference transmission driver corresponding to the fastest data lane. For instance, controller 212 can increase (and/or decrease) the drive strength and/or impedance incrementally (e.g., repeating step 406) until matching the signal speed of the reference transmission driver.

In some implementations, controller 212 can tune a transmission driver to more closely match the signal speed of the reference transmission driver without matching or approximating the desired signal speed. For example, a particular transmission driver can, after increasing (and/or decreasing) its driver strength and/or impedance to its safe maximum or minimum, not match the desired signal speed.

As described herein controller 212 can tune each of the plurality of data lanes by tuning a transmission driver of each data lane to a signal speed of fastest data lane, such that the reference data lane can approximate the average data lane aligned with clock circuit 214. In some implementations, controller 212 is configured to tune the plurality of transmission drivers (e.g., perform method 400) at a link high-speed startup sequence. Controller 212 can tune the transmission drivers when transitioning a link (e.g., including transmission drivers 218A-218N) from a low-speed mode to a high-speed mode. For example, the link can be booted (e.g., have its firmware boot) in the low-speed mode before transitioning to the high-speed mode for operation. This high-speed startup sequence can occur during various phases of system operation, such as during a system start (e.g., when system 200 starts, such as during a boot sequence), a wake up from a sleep state, etc. In some examples, controller 212 can tune the transmission drivers upon every start and/or wake up. In some examples, controller 212 can store the tuning offsets such that controller 212 can perform the tuning as needed (e.g., upon hardware changes to system 200, manual instruction to tune, etc.)

As detailed above, the systems and methods herein address data lane variation for die-to-die (or die-die) interfaces. In source synchronous clock forwarding interfaces, a differential clock/strobe signal will be forwarded along with a set of data lanes from one die to another die. This strobe is used to capture the data in the second die, by placing the strobe, at a relative quadrature phase position with respect to the data lanes to capture the data reliably. To improve overall bandwidth density, a greater number of data lanes can be paired for a given strobe (pair).

Die-die interfaces exhibit certain characteristics, including: (1) insertion loss and propagation delay of channels in short length die-die interfaces is generally minimal, and (2) slew rates and lane-lane skew play major role in signal integrity. In high-speed links and certain die-die interfaces, lane-to-lane variation is often not addressed because of the power and latency penalty involved in having per-lane skew correction. However, system and random variations can be significant in overall data or clock path delay. Any systematic/random variations on data/strobe lanes can disturb quadrature phase positioning of a data signal with respect to a clock signal, which can eat into eye margin and impede the achievable data rates.

Calibration codes can be used to calibrate drive strength/impedance of a transmission (Tx) driver. The systems and methods described herein provide an additional offset to the calibration codes to modulate each lane delay and compensate for any lane-lane variation.

In one implementation, a delay line on a clock I (in phase) signal and clock Q (in quadrature) signal as a primary delay line can be used to match a strobe path to farthest data lane first and then applying this code to all delay lines. Next, a data line drive strength is increased to reduce the lane delay and achieve accurate lane matching across all lanes.

By better matching data lanes, the systems and methods described herein can achieve better power supply induced jitter (PSIJ) cancellation, increase eye width, and allow a link to operate at a lower power and achieve better power efficiency. Alternatively, the link can be reliably run at a higher data rate (which can increase power consumption, e.g., at the expense of some power efficiency gains) to achieve higher overall bandwidth.

In one implementation, during an initialization sequence, driver impedance is calibrated, and a resulting code is applied to all lanes. For example, during data lane matching, for every data lane, a pair lane matching is performed, and a maximum code value can be applied to the pair for a delay line. Next, an offset addition code (which can be determined based on pre-mapping delay codes), is added to data lanes needing an improvement in overall delay, for instance to improve a drive strength to offset the additional delay of an excessive delay line code.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
    a data path comprising a plurality of transmission drivers; and
    a controller configured to:
        find a reference transmission driver of the plurality of transmission drivers based on measuring a signal delay of at least one of the plurality of transmission drivers; and
        tune each of the plurality of transmission drivers to a signal speed of the reference transmission driver of the plurality of transmission drivers.

2. The device of claim 1, wherein the controller is configured to find the reference transmission driver based on a tunability of other transmission drivers of the plurality of transmission drivers in matching the reference transmission driver.

3. The device of claim 1, wherein the controller is configured to find the reference transmission driver by selecting a transmission driver corresponding to a below average signal delay for the plurality of transmission drivers.

4. The device of claim 1, wherein the controller is configured to tune a transmission driver by changing a drive strength of the transmission driver to approximate the signal speed of the reference transmission driver.

5. The device of claim 1, wherein the controller is configured to tune a transmission driver by changing an impedance of the transmission driver to approximate the signal speed of the reference transmission driver.

6. The device of claim 1, further comprising a clock path comprising a reference clock circuit.

7. The device of claim 6, wherein the controller is configured to set a clock delay for the reference clock circuit to align with the signal speed of the reference transmission driver.

8. The device of claim 7, wherein the controller is configured to set the clock delay based on a midpoint of a phase of the reference transmission driver.

9. The device of claim 1, wherein the plurality of transmission drivers corresponds to a plurality of lanes for the data path.

10. The device of claim 1, wherein the data path corresponds to a die-to-die interface.

11. The device of claim 1, wherein the controller is configured to tune the plurality of transmission drivers at a link high-speed startup sequence.

12. A system comprising:
    a clock path comprising a reference clock circuit;
    a data path comprising a plurality of lanes and a plurality of transmission drivers corresponding to the plurality of lanes; and
    a controller configured to:
        find a reference transmission driver of the plurality of transmission drivers based on signal speed;
        set a clock delay for the reference clock circuit to align with a signal speed of the reference transmission driver; and
        tune each of the plurality of transmission drivers to the signal speed of the reference transmission driver.

13. The system of claim 12, wherein the controller is configured to find a fastest transmission driver as the reference transmission driver by measuring a signal delay of each of the plurality of transmission drivers and selecting a transmission driver corresponding to a minimum of the signal delays.

14. The system of claim 12, wherein the controller is configured to tune a transmission driver by changing a drive strength or an impedance of the transmission driver to approximate the signal speed of the reference transmission driver.

15. The system of claim 12, wherein the controller is configured to set the clock delay based on a midpoint of a phase of the reference transmission driver.

16. The system of claim 12, wherein the data path corresponds to a die-to-die interface.

17. The system of claim 12, wherein the controller is configured to tune the plurality of transmission drivers at a link high-speed startup sequence.

18. A method comprising:
    measuring a signal delay from a plurality of data lanes for a die-to-die interface to find a fast data lane with respect to signal speed;
    setting a clock delay for a reference clock to align with the fast data lane; and
    tuning each of the plurality of data lanes by tuning a transmission driver of each data lane to a signal speed of the fast data lane.

19. The method of claim 18, wherein tuning the transmission driver of each data lane comprises increasing a drive strength of the transmission driver based on a signal delay difference from a reference transmission driver corresponding to the fast data lane.

20. The method of claim 18, wherein tuning the transmission driver of each data lane comprises iteratively tuning the transmission driver to match a signal speed of a reference transmission driver corresponding to the fast data lane.

* * * * *